C. BREAM.
DISPENSER.
APPLICATION FILED NOV. 22, 1915.
1,280,654.
Patented Oct. 8, 1918.
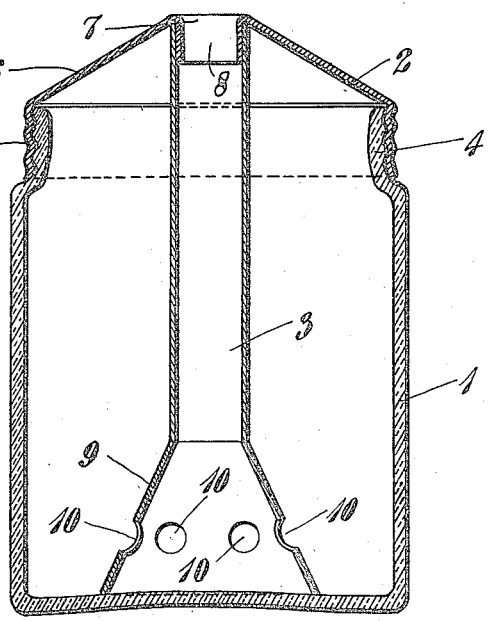
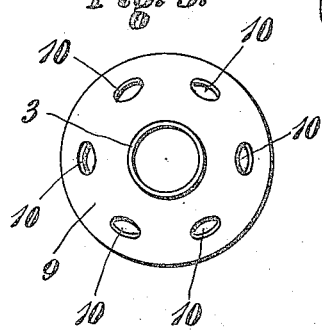
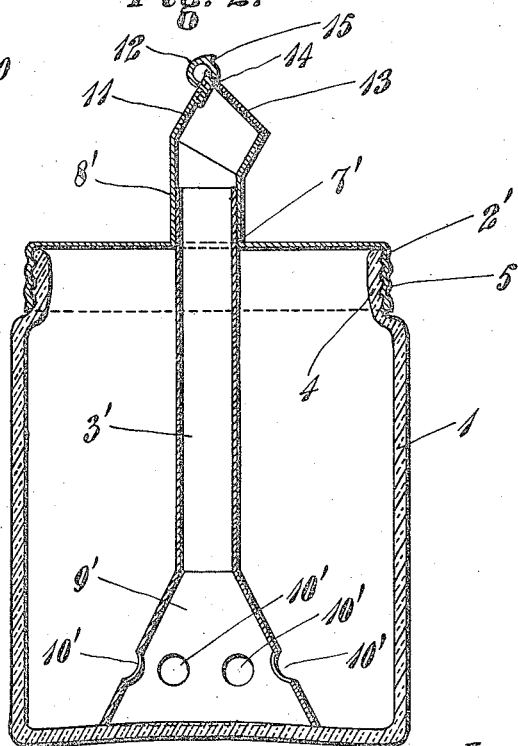
Witnesses:
Clarence Perdew
Catherine Doran
Inventor
Calvin Bream
By James N. Ramsey
Attorney.

UNITED STATES PATENT OFFICE.

CALVIN BREAM, OF CINCINNATI, OHIO.

DISPENSER.

1,280,654.  Specification of Letters Patent.  Patented Oct. 8, 1918.

Application filed November 22, 1915. Serial No. 62,773.

*To all whom it may concern:*

Be it known that I, CALVIN BREAM, a citizen of the United States, and a resident of Cincinnati, in the county of Hamilton and State of Ohio, have invented certain new and useful Improvements in Dispensers, of which the following is a specification.

My invention relates to dispensing apparatus, and more especially to improved sugar bowls; and its object is to render more convenient the dispensing of sugar and similar pulverized or granulated substances by eliminating unintentional excessive use and spillage.

My invention consists in the combination of parts and in the details of construction and arrangement of parts as will herein be more fully described and claimed.

In the drawing:

Figure 1 is a vertical cross section of a device embodying my invention;

Fig. 2 is a similar view of a device embodying the modification of my invention; and Fig. 3 is a detail plan view of the inner tube.

As shown in Fig. 1, there is an outer vessel 1, a cap or lid 2 and an inner tube 3. The outer vessel 1 is preferably of glass or similar material as shown, and has a slightly reduced threaded neck 4, while the cap or lid 2 has a bottom substantially cylindrical part 5, threaded to screw onto the neck 4 of the vessel 1, and an upwardly projecting conical part 6, which has at its top an opening 7 surrounded by a downwardly inwardly extending neck 8, preferably formed integral with the material of the cap or cover, which may be sheet metal.

The inner tube 3 is of a diameter at its upper end to fit snugly around the outside of the downwardly inwardly extending neck 8, and the lower end of this tube has a conical or inverted funnel-shaped part 9 with an open bottom which rests on the bottom of the vessel 1. A short distance up from the bottom, this conical part 9 has a series of openings 10 around in its side walls.

The openings 10 in the conical or funnel-shaped part 9 are large enough to allow a free inflow of the pulverized or granular substance into the interior of the funnel-shaped part 9 onto the central part of the bottom of the vessel 1, when said substance is contained in the vessel 1 up around the tube 3 and the funnel-shaped part 9, and when the vessel is in upright position. Under these conditions, the pulverized or granular substance will fill the funnel-shaped part 9 only up as far as the tops of the openings 10.

When the vessel 1 is inverted, with the parts so arranged therein, the amount of pulverized or granular substance that was contained in the interior of the conical or funnel-shaped part 9 will slide down through the tube 3 and out through the neck 8 and opening 7 and be discharged from the vessel; and only a very negligible amount of this substance that was contained in the funnel will pass back into the vessel around the tube 3 through the openings 10 upon this inversion of the vessel. The substance in the vessel around the outside of the funnel-shaped part 9 and around the tube 3, however, upon this inversion of the vessel will fall down away from the outwardly flaring exterior walls of the funnel-shaped part 9, and therefore the amount that will be discharged will be limited to that which was contained inside the funnel-shaped part 9 before the vessed was inverted. By regulating the distance of the tops of the holes 10 above the bottom of the vessel, in connection with regulation of the diameter of the funnel-shaped part 9, the device may be made so as to discharge any predetermined quantity at each inversion.

Thus, supposing the device to be used as a sugar bowl, and it be desired to discharge a spoonful of sugar at each operation, it is necessary only to invert the device, discharging one spoonful, then right it again, and then invert it to discharge another spoonful, and so on, according to the number of spoonfuls desired. By this means it is not rendered inconvenient to secure as much of the commodity as may be desired, but there is no liability of discharging more than is required, since a definite effort is necessary to discharge each unit of quantity.

Also, since the device is closed at all times and it is not necessary to open it to secure the commodity therefrom, as with the ordinary sugar bowl for instance, there is no considerable amount of spillage if the device is overturned, and there is less likelihood of contamination of the contents. In fact, there is small chance of any passage of contaminating substance into the vessel through the comparatively narrow tube 3, and if it does, it will only reach the interior of this tube and the contents contained therein at that time. Also, should the device be overturned, the most of the commodity that can be spilled is that contained in the conical part of the tube at the time. Insects are excluded to a practical extent, because the interior of the tube 3 is dark, and the insects will not crawl from a light place into a dark place.

For filling the vessel 1, the cap or cover 2 is unscrewed from the vessel, leaving the tube 3 with its conical bottom therein in the position shown, and then the commodity is filled in around the tube, after which the cap or cover 2 is again screwed upon the vessel. It is for this reason that it is preferable that the tube 3 be made readily detachable from the cap or cover 2, which is provided for by making the upper end slip snugly but not too tightly onto the inwardly downwardly extending neck 8.

In the modification shown in Fig. 2, the vessel 1 is like that shown in Fig. 1, with a neck 4 having screw threads thereon, but the cap 2', while it has the cylindrical threaded part 5', has its top flat instead of conical as in the preceding example.

The interior tube 3' is very similar to the tube 3 of the preceding example, having the lower conical part 9' with openings 10' therein, and operating as previously described. The cap 2, instead of having the neck downwardly and inwardly turned around its central opening 7', has an upstanding neck 8' around this opening, which has an upper termination or spout 11, preferably extending at a slight angle to the neck. The upper end of the interior tube 3' slips up inside of the neck 8', thus forming the communication between the tube and the spout for ready discharge of the contents. The upper end of this spout 11 has an eye 12 on its topmost part, and a small flat plate or disk 13 has an opening 14 through which it is held in the eye 12, and the eye 12 preferably has a lug 15 at its top. This disk 13 thus may swing up on this eye 12 loosely, but its upward movement will be limited by the lug 15. Where the device is inverted, this movement of the disk 13 will be downward under the action of gravity, and then, when the device is righted again, the disk 13, having been limited in its opening movement by the lug 15, will readily drop back over the end of the spout 11, closing the spout and the tube 3' against the entrance of foreign substances or insects.

The device as shown in Fig. 1 is preferable where it is desired to avoid liability of overturning the device in crowded places, as on tables in restaurants and hotels and other public places; while the device as shown in Fig. 2 is more adapted where a long spout is desired for more exactness in discharging the contents, and where the spout will not be objectionable, as for instance in household use, where it is not so liable to be struck and the device overturned.

Having fully described my invention, what I claim as new and desire to secure by Letters Patent is:

1. In a dispenser, a container, a top detachably secured on said container and having an outlet opening, and a tube extending up and communicating with said opening and being detachably secured to said top whereby the top may be removed from said container and leave said tube undisturbed in said container, said tube running interiorly of said container from its detachable connection with said top entirely to and resting upon the bottom of said container, and flaring at a substantial angle in its lower end part next to said bottom, and having an opening through the side of its flaring part a distance up from its lower end and from said bottom determined by the height to which it is desired a granular or pulverulent commodity shall rise in said tube, as admitted through said opening from the interior of said container around said tube while said container is in upright position.

2. In a dispenser, a container, a top detachably secured on said container and having an outlet opening, and a collar on said top around said opening and extending down into said container, and a tube extending up and fitting said collar under said top and thereby communicating with said opening and being thus detachably secured to said top whereby the top may be removed from said container and leave said tube undisturbed in said container, said tube running interiorly of said container from its detachable connection with said top entirely to and resting upon the bottom of said container, and having an opening through its side a distance up from its lower end and from said bottom determined by the height to which it is desired a granular or pulverulent commodity shall rise in said tube, as admitted through said opening from the interior of said container around said tube while said container is in upright position.

3. In a dispenser, a container, a top detachably secured on said container and having an outlet opening, and a collar on said top around said opening and extending down into said container, and a tube extending up and fitting said collar under said top and thereby communicating with said opening and being thus detachably secured to said top whereby the top may be removed from said container and leave said tube undisturbed in said container, said tube running interiorly of said container from its detachable connection with said top entirely to and resting upon the bottom of said container, and flaring at a substantial angle in its lower end part next to said bottom, and having an opening through the side of its flaring part a distance up from its lower end and from said bottom determined by the height to which it is desired a granular or
5 pulverulent commodity shall rise in said tube, as admitted through said opening from the interior of said container around said tube while said container is in upright position.

CALVIN BREAM.

Witnesses:
 JAMES N. RAMSEY,
 CLARENCE PERDEW.